United States Patent
Habing et al.

(10) Patent No.: US 6,211,934 B1
(45) Date of Patent: *Apr. 3, 2001

(54) METHOD OF AND APPARATUSES FOR REDUCING INFRARED LOADING ON DISPLAY DEVICES

(75) Inventors: Robert D. Habing; James M. Henz; Randy M. Maner, all of Albuquerque; Teddy J. Wood, Corrales, all of NM (US)

(73) Assignee: Honeywell Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,104

(22) Filed: Dec. 24, 1997

(51) Int. Cl.[7] .................................................. G02F 1/1335
(52) U.S. Cl. ........................ 349/105; 349/104; 349/113; 349/137
(58) Field of Search ..................................... 349/104, 105, 349/113, 137

(56) References Cited

U.S. PATENT DOCUMENTS

| | | | |
|---|---|---|---|
| 4,687,298 | 8/1987 | Aoki et al. | 350/334 |
| 4,749,261 | * 6/1988 | McLaughlin et al. | 350/339 |
| 4,806,221 | * 2/1989 | Gillery | 204/192.29 |
| 5,132,830 | 7/1992 | Fukutani et al. | 359/67 |
| 5,150,235 | 9/1992 | Haim et al. | 359/68 |
| 5,187,510 | * 2/1993 | Vogeley et al. | 353/122 |
| 5,196,953 | 3/1993 | Yeh et al. | 359/73 |
| 5,232,634 | 8/1993 | Sawada et al. | 252/584 |
| 5,237,437 | 8/1993 | Rupp | 359/68 |
| 5,239,406 | 8/1993 | Lynam . | |
| 5,249,071 | 9/1993 | Yoshimizu et al. | 359/63 |
| 5,299,041 | 3/1994 | Morin et al. | 359/59 |
| 5,311,340 | 5/1994 | Murata et al. | 359/73 |
| 5,661,578 | 8/1997 | Habing et al. | 349/65 |
| 5,680,185 | * 10/1997 | Kobayashi et al. | 349/88 |
| 5,706,067 | * 1/1998 | Colgan et al. | 349/114 |
| 5,724,111 | * 3/1998 | Mizobata et al. | 349/113 |
| 5,754,262 | * 5/1998 | Lengyel | 349/104 |
| 5,768,019 | * 6/1998 | Niwa et al. | 349/113 |
| 5,808,714 | * 9/1998 | Rowlands et al. | 349/105 |

FOREIGN PATENT DOCUMENTS

| | | |
|---|---|---|
| 3120601 A1 | 12/1982 | (DE) . |
| 196 06 224 A 1 | 8/1997 | (DE) . |
| 08184827 | 7/1996 | (JP) . |
| WO 96/326663 | 10/1996 | (WO) . |
| WO 97/00335 | * 1/1997 | (WO) . |

* cited by examiner

Primary Examiner—William L. Sikes
Assistant Examiner—Tarifur R. Chowdhury
(74) Attorney, Agent, or Firm—Loria B. Yeadon; Andrew A. Abeyta

(57) ABSTRACT

Methods of and apparatuses for reducing the solar or infrared loading on display devices. A reflective material is positioned between a radiant energy source and the absorptive material of a display device to reflect wavelengths of radiant energy in the infrared or near-infrared range. The reflective material allows visible radiant energy to be transmitted, while reflecting the infrared radiant energy to reduce the infrared loading on the display device. The present invention reduces the temperature rise of the display device due to infrared loading by reflection rather than absorption of the radiant energy, while preserving the integrity of the visible wavelength range. The reflective material reduces the infrared loading on the display device by up to 50%.

16 Claims, 3 Drawing Sheets

METHOD OF AND APPARATUSES FOR REDUCING INFRARED LOADING ON DISPLAY DEVICES

I. CROSS-REFERENCE TO RELATED APPLICATIONS

Not applicable.

II. BACKGROUND OF THE INVENTION

The present invention relates generally to the field of display devices, such as liquid crystal displays ("LCDs"), cathode ray tubes ("CRTs"), and similar display devices. More specifically, the present invention relates to methods of and apparatuses for reducing the infrared loading (e.g., solar loading from the sun) on such display devices by using a reflective material to reflect infrared energy.

A "display" is an image output device that provides information to an observer in a visible form. A "liquid crystal display" ("LCD") is a display device that includes a liquid crystal cell with a light transmission characteristic that can be controlled in parts of the cell by an array of light control units to cause presentation of an image. A "liquid crystal cell" is an enclosure containing a liquid crystal material. An "active-matrix liquid-crystal display" ("AMLCD") is an LCD in which each light control unit has a nonlinear switching element that causes presentation of an image segment by controlling a light transmission characteristic of an adjacent part of the liquid crystal cell. An LCD can have a plurality of electrically-separated display regions, each display region also being known as a display cell, or when the regions designate a small portion of the display, each display region is known as a "pixel." Each pixel in a high density display matrix, such as for LCDs, requires its own active (switching element) driver (e.g., a thin film transistor).

In recent years, LCD devices have become more popularly used in avionics and ground vehicle displays because of the low power consumption, high reliability, high ambient readability, and compact packaging of LCDs. Also, personal computers, portable game machines, hand-held devices, wrist watches, gas station pumps, and numerous other devices requiring a visual interface often use LCDs to display data. All of these types of display devices and many others are likely to be exposed to the sun or radiant energy thus creating a thermal rise due to solar exposure thereon (solar loading).

In most display devices that are subject to receiving radiant energy, the following problems are posed. The display device often experiences a temperature rise of the display device due to solar loading or other radiant energy sources. For example, it is possible for a display device to experience solar loading on its surface up to 116 W/ft$^2$ depending on its application. This solar loading problem is intensified when cooling methods, such as forced cooling air, are unavailable. As a result, the display device can be permanently damaged, such as is the case with polarizers and adhesives associated with LCDs when exposed to temperatures in excess of 100° C. Also, sometimes the liquid crystal material of an LCD device "clears" (exceeds its operating capability due to the temperature of the liquid crystal). When liquid crystal material "clears" it transitions from the nematic phase and becomes anistropic, effectively randomizing the birefringent characteristic of the liquid crystal material, which takes time and temperature changes to return to its operating state.

To date, some attempts have been directed toward remedying the solar loading phenomena and its associated problems. With regard to LCDs, one proposed solution is to increase the limiting temperature of the liquid crystal materials and polarizers. This approach alleviates the problem, but the availability of these materials is limited. Also, this approach is not practical for commercially-available liquid crystal materials due to a significant cost factor. Another proposed solution has been to force cool air over the exterior face of the display device, i.e., the display device surface that is exposed to the viewer. This approach is practical only when cooling air is available, which is not always the case. Yet another workaround has been the use of a cover to protect the display device from temperature increases due to solar loading. Thus, a need exists to reduce the solar loading on display devices that are subjected to a thermally-challenging environment. Accordingly, the present invention discloses a method of and apparatus for reducing the solar loading on display devices.

III. BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention comprises a display device that receives radiant energy from an external radiant energy source such as the sun, the display device comprises a transparent absorptive material that absorbs heat from the energy source and a reflective material or coating placed between the absorptive material and the energy source to reflect a predetermined infrared wavelength range of the radiant energy, thereby reducing the thermal rise due to the external radiant energy.

Another aspect of the present invention comprises a liquid crystal display ("LCD") device that receives radiant energy from an energy source such as the sun, the LCD device comprises a first transparent plate and second transparent plate, which are spaced apart with respect to each other to form a liquid crystal cell between the plates, which cell is filled with a liquid crystal material; a front polarizer and rear polarizer contain the first and second transparent plates between them; a cover glass is placed over the front polarizer; and a reflective material or coating is placed between the front polarizer of the LCD, which absorbs heat from the sun, and the energy source to reflect a predetermined infrared wavelength range of the radiant energy. The reflective coating can be on either the interior or exterior surface of the cover glass as long as the radiant energy is reflected before reaching the front polarizer and thus the liquid crystal material. An anti-reflective coating is usually added to the cover glass to reduce specular reflectance, in which case the reflective and anti-reflective material properties are reconciled to accomplish each of their respective purposes. The particular radiant energy to be reflected is in the infrared range, i.e., wavelengths greater than the visible spectrum, which is typically above 0.7-µm.

Also, the present invention comprises a method for reducing solar loading on display devices. The method comprises the steps of selecting a suitable reflective material to reflect a predetermined wavelength range of the radiant energy; and providing the reflective material between the absorptive material of the display device and the external radiant energy source.

The reflective coating material allows visible light energy to be transmitted, while reflecting the infrared light energy to reduce the solar loading on display devices up to 50%. The present invention removes heat (infrared energy) from the sun by reflection rather than absorption, while preserving the integrity of the visible wavelength range to allow for the presentation of information.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

IV. BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

V. DETAILED DESCRIPTION OF THE INVENTION

Although the following description of the present invention is provided with reference to a light-transmitting type active-matrix LCD device, the present invention is not restricted to this particular type of display. The present invention is directed toward any display that is used in an environment where solar loading on the display device is of concern, such as active-matrix LCDs, passive-matrix LCDs, reflective LCDs, transreflective LCDs, segmented LCDs, cholesteric LCDs, non-matrix LCDs, CRTs, etc. The following description is provided with respect to an LCD for convenience in introducing the present invention, but the present invention applies to any display device experiencing solar loading. Additionally, those skilled in the art will recognize that the present invention is limited neither to active-matrix LCD devices in general nor to LCD devices of any certain addressability (e.g., 640 by 480). In this regard, the present invention can also be used with any form of passive-matrix LCD devices that are used in an environment where solar loading is a problem.

The present invention is a passive design that reduces the solar load on the LCD device without the need to have power applied to the LCD device or external cooling system activated. The present invention can be easily incorporated into commercially-available glass, especially because a cover glass is usually added to the LCD device for environmentally-demanding applications, e.g., avionics, ground vehicles, industrial, etc. It is contemplated that the need for the present invention will become even more critical with LCD devices having a larger surface area. For example, a 8"×10" LCD has a larger surface area than a 4"×4" LCD and, thus, would collect more solar energy.

Figure 1:
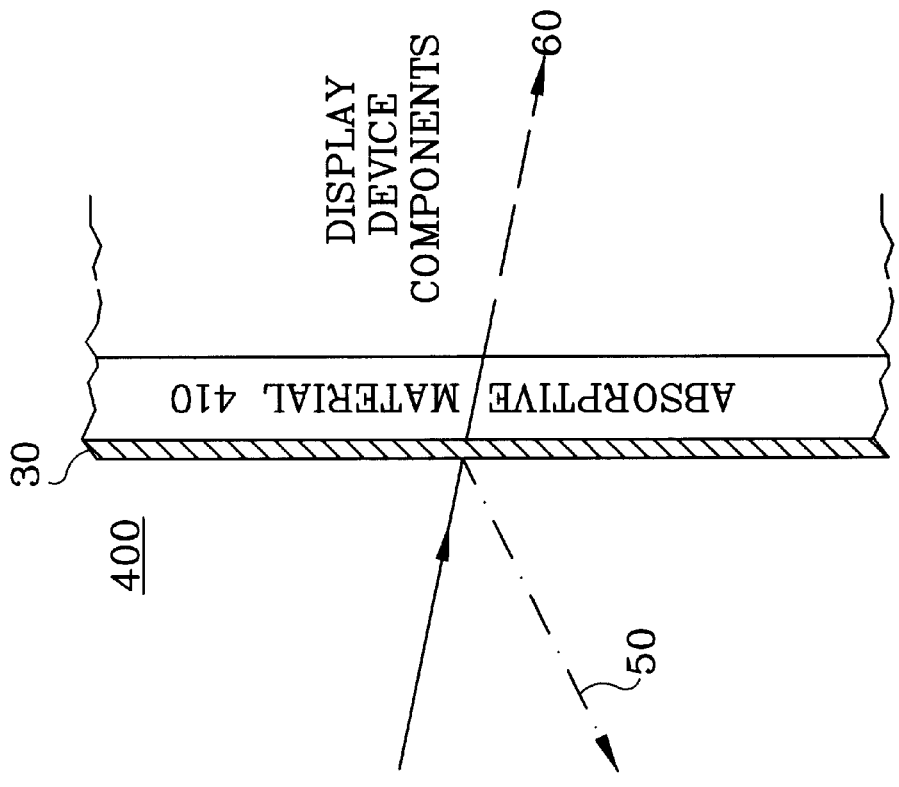
FIG. 1 is a simplified side view of a cross section of a display device panel illustrating the reflective material 30 in accordance with the principles of the present invention (drawing not to scale).
Figure 1:
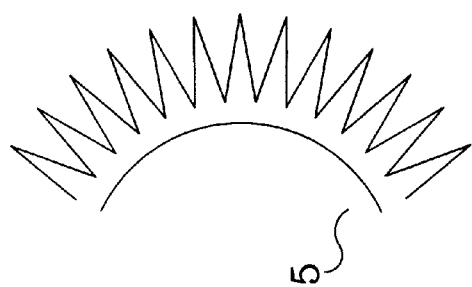

Referring to FIG. 1, there is shown a cross-sectional view of a pertinent portion of a display device 400 in accordance with the principles of the present invention. Radiant energy source 5 emits radiant energy in the visible wavelength range or spectrum (nominally covering the range between 0.4-$\mu$m and 0.7-$\mu$m, approximately 40% of the total radiant energy) and in the infrared wavelength range (nominally covering the range between 0.7-$\mu$m and 3.0-$\mu$m, approximately 51% of the total radiant energy) for a total of approximately 91% of radiant energy after passing through the Earth's atmosphere. Applications requiring additional reduction can reflect infrared energy over the range of 0.7-$\mu$m to 15-$\mu$m (approximately 53% of the total radiant energy) to reduce the solar loading on the display device. (For reference purposes, *The Infrared Handbook*, The Infrared Information and Analysis (IRIA) Center, Environmental Research Institute of Michigan, Chapter 3 (1978), which describes the solar spectral irradiance and provides spectral distribution curves, provides a discussion of the radiant energy produced by the sun.) A reflective material 30 is positioned between radiant energy source 5 and the transparent absorptive material 410. Without the presence of reflective material 30, absorptive material 410 absorbs a substantial portion of the radiant energy in the infrared wavelength range which results in a thermal rise on the display device. Reflective material 30 blocks the infrared or near-infrared wavelength range emitted from radiant energy source 5 while allowing the visible wavelength range to be transmitted therethrough. An anti-reflective material 10 can be applied to the exterior surface of the display device as discussed below with respect to FIG. 2. Referring again to FIG. 1, also associated with the display device are other conventional components 410, a discussion of which is not necessary for understanding the present invention.

Figure 2:
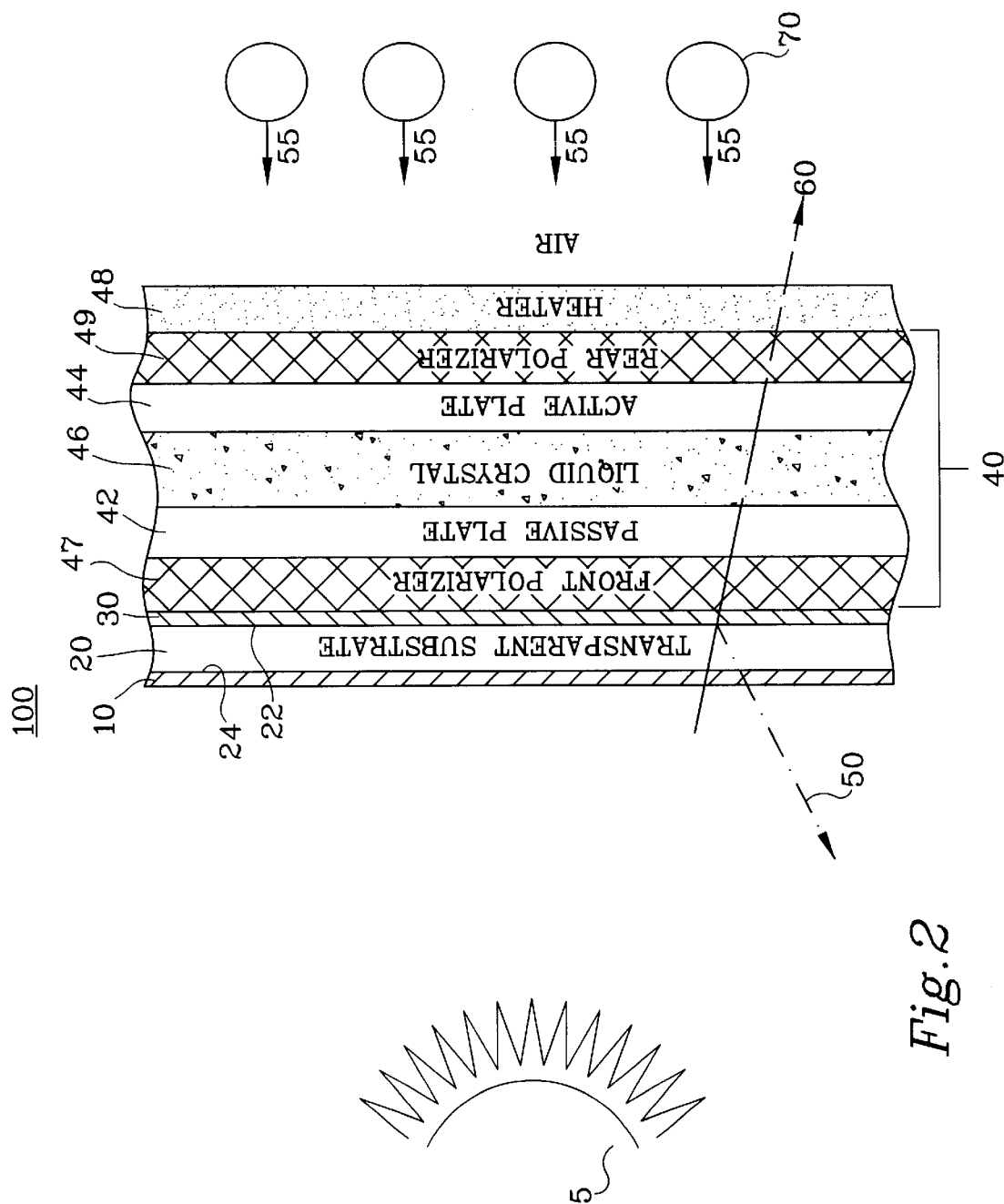
FIG. 2 is a simplified side view of a cross section of an LCD panel illustrating the reflective material 30 on the cover glass in accordance with the principles of the present invention (drawing not to scale).

The incoming infrared or near-infrared wavelengths 50 are first transmitted through anti-reflective material 10 (if present as in FIG. 2). The infrared wavelengths 50 are reflected off of reflective material 30 and back through the anti-reflective material 10. Reflective material 30 blocks substantially all of the infrared wavelengths 50 from being transmitted to the absorptive material 410 as shown in FIG. 1. Reflective material 30 allows the visible wavelengths 60 to be transmitted as shown in FIG. 1.

The remaining discussion of the present invention is directed toward an LCD device as an example only; those skilled in the art will recognize that the principles of the present invention are not limited to LCD devices and can be applied to any display device.

Referring to FIG. 2, there is shown a cross-sectional view of a pertinent portion of an LCD device 100 in accordance with the principles of the present invention. Radiant energy source 5 emits radiant energy in the visible wavelength range or spectrum (nominally covering the range between 0.4-$\mu$m and 0.7-$\mu$m) and in the infrared wavelength range (above 0.7-$\mu$m as discussed above). A reflective material 30 is positioned between radiant energy source 5 and the LCD panel 40. Reflective material 30 blocks the infrared or near-infrared wavelength range emitted from radiant energy source 5 while allowing the visible wavelength range to be transmitted therethrough. Also, a second reflective material (not shown as not necessary for the understanding) can be positioned between the rear polarizer 49 and backlight 70 to block the infrared or near-infrared wavelength range emitted from backlight 70 while allowing the visible wavelength range to be transmitted therethrough.

In many conventional LCD devices, a passive transparent substrate 20 (optic material), usually a polycarbonate or glass cover, is positioned before the LCD panel 40 to protect, for example, the LCD panel 40 from users touching the surface of the LCD device or contaminants from being deposited on the surface of the LCD device. Reflective material 30 is applied on an interior surface 22 of transparent substrate 20 in accordance with the present invention. Also, in many conventional LCD devices, an anti-reflective material 10 is applied to the exterior surface 24 of transparent substrate 20 to minimize specular reflections and maximize visible transmission. For any optical element, there is always some reflection at each air-to-surface interface. The anti-reflective material 10 reduces the index of refraction mismatch from the air to the transparent substrate of the LCD panel 40 and is deposited at a predetermined thickness which minimizes the reflection in the visible spectrum. Reflective material 30 allows light in the visible wavelength range, such as visible light 60, to be transmitted in any direction as shown in FIG. 2.

Referring to FIG. 2, passive plate 42 and active plate 44, which are usually constructed of glass, are spaced apart to form a liquid crystal cell therebetween, which is filled with a liquid crystal material 46. One method of assembling the LCD device, although other assembly methods will work, is by positioning the LCD panel 40 and the transparent substrate 20 facing each other such that the reflective material 30 is positioned between transparent substrate 20 and LCD panel 40 as shown in FIG. 2. The transparent substrate 20 and LCD panel 40 are usually full surface laminated or sealed at their periphery with the aid of, for example, an adhesive joint (not shown) in a manner well known to those skilled in the art. A front polarizer 47 is positioned on the exterior of passive plate 42, while a rear polarizer 49 is positioned on the exterior of active plate 44. In practice, the front polarizer 47 accounts for the significant absorption of the energy from the sun or other radiant energy source (similar to the absorptive material 410 in FIG. 1). Thus, the reflective material is most advantageously placed between the front polarizer 47 and the radiant energy source 5. A heater 48 can be positioned on the exterior of rear polarizer 49, as shown in FIG. 2 to provide a means for increasing the temperature in the liquid crystal material 46 if necessary for the application.

For ease of illustration and not by way of limitation, not all LCD device elements are shown in FIG. 2 or discussed herein as they are not necessary for the understanding of the present invention as will be recognized by those skilled in the art. A typical LCD device can include other elements as is well known to those skilled in the art. For example, passive plate 42 can include a plurality of color filters (not shown). Generally, the LCD components are contained within a housing as is known to those skilled in the art. Also, other components are typically associated with an LCD device, such as, power supply, electrodes, control and driver circuitry, memory requirements, and the like.

The incoming infrared or near-infrared wavelengths 50 are first transmitted through anti-reflective material 10 (if present). Next, the infrared wavelengths 50 are transmitted through the transparent substrate 20. Finally, the infrared wavelengths 50 are reflected off of reflective material 30 and back through the transparent substrate 20 and then through the anti-reflective material 10. Reflective material 30 blocks substantially all of the infrared wavelengths 50 from being transmitted to LCD panel 40. Reflective material 30 allows the visible wavelengths 60 to be transmitted as shown in FIG. 2.

The indices of refraction, n, i.e., the ratio of the velocity of light in a vacuum to that of the light in the medium, for all materials through which the light energy is transmitted is an important design consideration (e.g., n for anti-reflective material 10, transparent substrate 20, reflective material 30, front polarizer 47, passive plate 42, liquid crystal material 46, active plate 44, rear polarizer 49, heater 48, air, etc.). For example, reflective material 30 is selected such that it does not interfere with the purpose of anti-reflective material 10. It is well within the skill level of those skilled in the art to select a suitable reflective material 30, match the indices of refraction appropriately, deposit the reflective material at a sufficient thickness, deposit the reflective material in multi-layer coatings, etc.

Generally, the category of reflective materials that are suitable for use in the present invention is dielectric, although any material that is transparent in the visible spectrum and reflective in the infrared spectrum will suffice. The type, order, and thickness of deposition of materials to create reflective material 30 are selected as a function of the wavelength of light that is desired to be reflected and transmitted. The reflection requirements of reflective material 30 will vary depending on the solar reduction desired. The reflective material 30 can include multi-layer, dielectric coatings of thin film materials, both low-index (e.g., magnesium fluoride, cerium fluoride, etc.) and high-index (e.g., zinc sulfide, titanium dioxide, etc.). In addition, the multi-layered coatings should have small interfacial roughness in order to minimize scattering losses and maximize reflectivity (in infrared spectrum) or transmissivity (in the visible spectrum) depending on the particular wavelengths of interest. Reflective materials that satisfy these desired properties are available from, for example, Corion Corporation, 73 Jeffrey Ave., Holliston, Mass. 01746-2082, but other commercial suppliers exist as well.

Ideally, the reflective material is applied at a uniform thickness to the interior surface 22 of the transparent substrate 20. The reflective material 30 can be applied to the transparent substrate 20 by numerous methods, which will become apparent to those skilled in the art. A typical method is vacuum deposition to deposit the reflective material onto transparent substrate 20. Those skilled in the art will recognize that other methods can be used to apply reflective material 30 to transparent substrate 20 or to front polarizer 47. Regardless of the method used, the principle of the present invention is to position a reflective material 30 between the radiant energy source 5 and the absorptive material (for example, the front polarizer 47 of LCD panel 40 in FIGS. 2 and 3).

Figure 3:
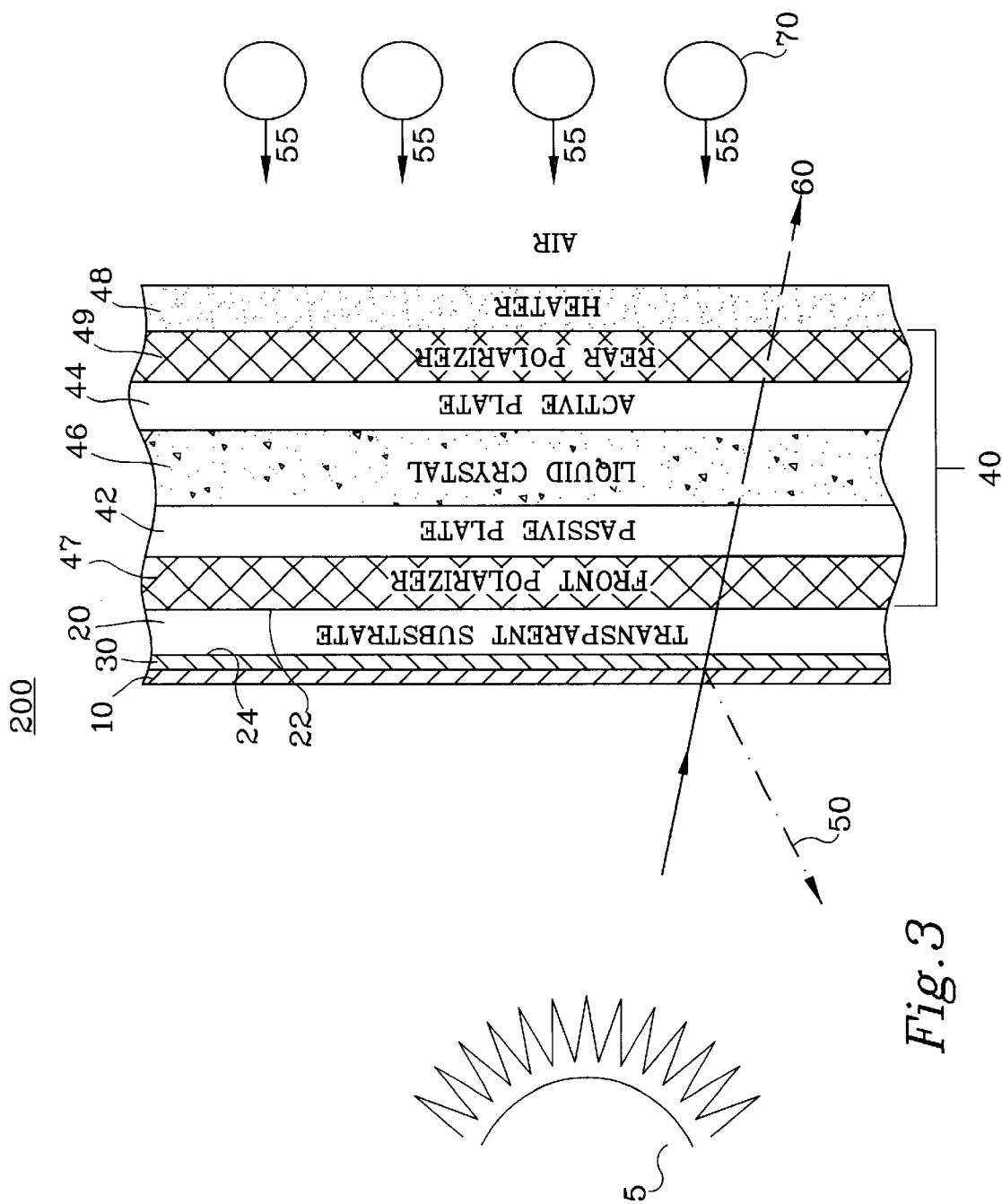
FIG. 3 is a simplified side view of a cross section of an alternate embodiment 200 of an LCD in accordance with the principles of the present invention (drawing not to scale).

Referring to FIG. 3, there is shown an alternate embodiment of an LCD device 200. The reflective material 30 can be positioned between anti-reflective material 10 and exterior surface 24 of transparent substrate 20. In yet another alternate embodiment (not shown), reflective material 30 can be positioned within transparent substrate 20, i.e., between its interior surface 22 and exterior surface 24, although this embodiment would increase the cost of the overall LCD device and would be more of a challenge to produce. In still another alternate embodiment (not shown), a compound of the reflective material 30 and anti-reflective material (i.e., a combination of reflective material 30 and anti-reflective material 10) can be positioned between the radiant energy source 5 and the LCD panel 40. Thus, the foregoing demonstrates that the present invention can involve various arrangements as long as the principle, the positioning of a reflective material 30 between the radiant energy source 5 and the absorptive material (e.g., LCD panel 40 in FIGS. 2 and 3 or absorptive material 410 in FIG. 1) to reduce solar loading thereon, is followed.

The particular values and configurations discussed in this non-limiting example can be varied and are cited merely to illustrate an embodiment of the present invention and are not intended to limit the scope of the invention. In one test conducted at Honeywell Inc. demonstrated that the use of reflective material 30 resulted in at least a 30% reduction in solar load on an LCD device in accordance with the present invention. The reflective material 30 reflected energy in the wavelength range from 760-nm to 1200-nm. In another test, use of reflective material 30 resulted in a 50% reduction in solar load on an LCD device. In the test, infrared-absorbing glass (KG 3 Schott Filter Glass by Corion Corporation) was used in addition to the reflective material 30 to simulate the effect of a custom-made reflective material 30 that went beyond the 1200-nm wavelength that is reflected by conventional hot mirrors, i.e., a conventional hot mirror (reflected up to about 1200-nm) and an infrared-absorbing glass (absorbed beyond 1200-nm) were combined to be a suitable reflective material 30 for rejecting (reflecting and absorbing) wavelengths above 700-nm. A thermal analysis predicted that a reflective material 30 that would reduce the solar load by 50% on an unpowered LCD would also reduce the LCD temperature rise by 50%.

Other variations and modifications of the present invention will be apparent to those of skill in the art, and it is the intent of the appended claims that such variations and modifications be covered. For example, the present invention can be adapted to reflect radiant energy that falls in the ultra-violet spectrum (typically below about 400-nm). The particular values and configurations discussed above can be varied and are cited merely to illustrate particular embodiments of the present invention and are not intended to limit the scope of the invention. It is intended that the scope of the present invention be defined by the claims appended hereto.

What is claimed is:

1. An apparatus for passively reducing a solar load on an LCD device, the apparatus comprising:
   a first transparent plate, the first transparent plate having an interior and an exterior surface;
   a second transparent plate, the second transparent plate having an interior and an exterior surface, the second transparent plate being disposed with its interior surface facing the interior surface of the first transparent plate, the first and second transparent plates being spaced apart with respect to each other to form a liquid crystal cell between the interior surfaces of the first transparent plate and the second transparent plate, the liquid crystal cell containing a liquid crystal material therein;
   a front polarizer adjacent the exterior surface of the first transparent plate, the front polarizer having an interior and an exterior surface; and
   a coating comprising a combination of reflective material for reflecting non-visible infrared radiant energy combined with an anti-reflective material for minimizing reflections of visible radiant energy interposed between the front polarizer and the energy source, said coating being affixed on a viewer's side.

2. The LCD device of claim 1, further comprising a transparent substrate, the transparent substrate having an interior and exterior surface, the interior surface of the transparent substrate being adjacent the exterior surface of the front polarizer.

3. The LCD device of claim 2, wherein said coating is adjacent to the interior surface of the transparent substrate.

4. The LCD device of claim 2, wherein said coating is adjacent to the exterior surface of the transparent substrate.

5. The LCD device of claim 1, wherein said coating comprises a dielectric material.

6. An apparatus for passively reducing a solar load on an LCD device, the apparatus comprising:
   an absorptive material having an interior and an exterior surface, the exterior surface facing the radiant energy source and the interior surface facing a plurality of display device components;
   a coating comprising a combination reflective material for reflecting non-visible infrared radiant energy combined with an anti-reflective material for reflecting reflections of visible radiant energy interposed between the exterior surface of the absorptive material and the energy source.

7. A method for reducing infrared energy loading on a display device, the infrared energy loading being due to an absorptive material of the display device receiving radiant energy from an energy source, the method comprising the steps of:
   selecting a suitable coating comprising a combination of a reflective material for reflecting non-visible infrared radiant energy combined with an anti-reflective material for minimizing reflections visible radiant energy; and
   providing the coating between the absorptive material and the energy source on a viewer's side.

8. The method of claim 7, wherein the step of selecting a suitable coating further comprises the step of depositing the coating on an exterior surface of the absorptive material at a uniform thickness.

9. The method of claim 7, wherein the step of selecting a suitable coating further comprises the step of depositing the coating as multi-layer coatings.

10. A method for reducing infrared loading on a liquid crystal display ("LCD") device, the infrared loading being due to the LCD device receiving radiant energy from an energy source, the LCD device having a liquid crystal cell formed between a first and second transparent plate, the first transparent plate having an exterior surface facing the energy source and an interior surface facing the liquid crystal, the method comprising the steps of:
   selecting a suitable coating comprising a combination reflective material to reflect a predetermined wavelength range of the radiant energy combined with an anti-reflective material for minimizing reflections of visible radiant energy; and
   providing the coating between the liquid crystal cell and the energy source on a viewer's side.

11. The method of claim 10, wherein the predetermined wavelength range of radiant energy is a wavelength range representing infrared or near-infrared energy.

12. The method of claim 10, wherein the reflective material is selected to reflect radiant energy in the wavelength range greater than 0.7-:m.

13. The method of claim 10, further comprising the steps of:
   providing a transparent substrate to cover the exterior surface of the first transparent plate, the transparent substrate having an interior and an exterior surface; and
   applying the coating to either the exterior or interior surface of the transparent substrate.

14. The method of claim 13, wherein the step of applying the coating comprises the step of depositing the coating at a uniform thickness.

15. The method of claim 13, wherein the step of applying the coating comprises the step of depositing the coating as multi-layer coatings.

16. The apparatus produced by the method of claim 13.

* * * * *